United States Patent
Leumann et al.

[11] 3,867,322
[45] Feb. 18, 1975

[54] EPOXYSILANE ADDITIVES FOR EPOXIDE RESIN ADHESIVES

[75] Inventors: Ernst Leumann, Arlesheim; Hans Lehmann, Basel, both of Switzerland

[73] Assignee: Ciba-Geigy Corporation, Ardsley, N.Y.

[22] Filed: Oct. 2, 1973

[21] Appl. No.: 402,882

Related U.S. Application Data

[62] Division of Ser. No. 265,919, June 23, 1972, Pat. No. 3,787,452.

[30] Foreign Application Priority Data
June 29, 1971  Switzerland.......................... 9527/71

[52] U.S. Cl. ....... 260/18 S, 260/18 PN, 260/18 EP, 260/47 EP, 260/824 EP
[51] Int. Cl............................................. C08g 47/10
[58] Field of Search ........ 260/383 SC, 18 S, 18 PN, 260/18 EP, 824 EP, 348 SC,

[56] References Cited
UNITED STATES PATENTS

| | | | |
|---|---|---|---|
| 3,223,577 | 12/1965 | Plueddemann | 260/824 |
| 3,317,369 | 5/1967 | Clark et al. | 260/824 |
| 3,391,054 | 7/1968 | Lewis et al. | 260/824 |
| 3,556,754 | 1/1971 | Marsden et al. | 260/824 |

OTHER PUBLICATIONS
Adhesives Age, 1968, p. 25-27, Polniaszek et al.

*Primary Examiner*—Eugene C. Rzucidlo
*Attorney, Agent, or Firm*—Vincent J. Cavalieri

[57] ABSTRACT

The invention relates to epoxysilanes of the formula I

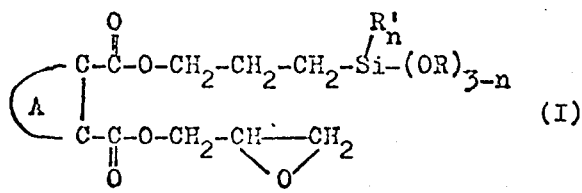

in which A denotes a cycloaliphatic five-membered or six-membered ring or an aromatic ring, R and R' each denote an alkyl group with 1 to 4 carbon atoms and $n$ denotes 0, 1 or 2, and their use in adhesives, to which they impart increased resistance to tropical conditions and to water. Embodiments of the invention are glycidyltriethoxysilyl esters of tetra- or hexahydrophthalic acid.

5 Claims, No Drawings

EPOXYSILANE ADDITIVES FOR EPOXIDE RESIN ADHESIVES

This is a Divisional of application Ser. No. 265,919, filed on June 23, 1972, now U.S. Pat. No. 3,787,452.

The invention relates to new epoxysilanes and their use in adhesives, especially those based on epoxide resin, to which they impart increased resistance to tropical conditions and to water.

Epoxysilanes have been known for a number of years and can be of such structure that the epoxide groups are linked to the Si atom via C atoms or are linked to the Si atom via, for example, O-bridges.

It is furthermore known that certain properties such as water resistance, heat stability and mechanical properties can be improved by adding epoxysilanes to plastics.

If adhesives are intended to show good water resistance, it is appropriate to employ those epoxysilanes which carry the epoxide group in hydrocarbon radicals which are stable to hydrolysis or in glycidyl groupings and are linked to the Si atoms via C atoms. Such epoxysilanes are known.

It was therefore surprising and not foreseeable that with new epoxysilanes according to the invention, which carry the epoxide group in ester groups which are known to be sensitive to hydrolysis, it is possible to achieve adhesive bonds, especially adhesive bonds to metals, which show increased water resistance and an improvement in mechanical properties, such as the tensile shear strength, can be achieved relative to the known epoxysilanes having hydrolysis-resistant epoxide groups, if the epoxysilanes are used in adhesives, especially those based on epoxide resin.

The epoxysilanes according to the invention correspond to the formula I

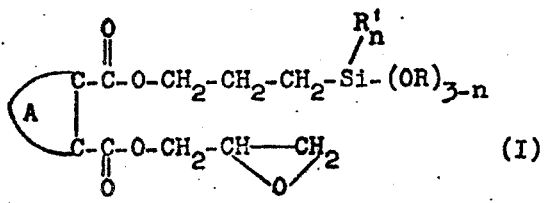

(I)

in which A denotes a cycloaliphatic five-membered or six-membered ring or an aromatic ring, R and R' each denote an alkyl group with 1 to 4 carbon atoms and $n$ denotes 0, 1 or 2.

Epoxysilanes of the formula I in which A denotes a cycloaliphatic ring, especially a cyclohexane or cyclohexene ring, and $n$ denotes 0 or 1, are preferred.

Further, epoxysilanes of the formula I which contain the methyl or ethyl group as the radical R are preferred. If the radical R' is present, it is preferably the methyl group.

The compounds of the formula I can be manufactured by reacting compounds of the formula II

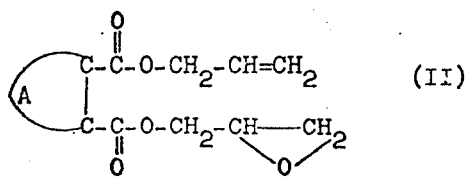

(II)

with silanes of the formula (III)

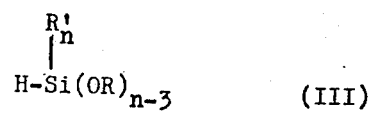

(III)

The reaction preferably takes place at elevated temperature, for example between 100° and 150°C, and in the presence of a catalyst, for example based on metallic platinum or platinum compounds, such as platinum hexachloride. Advantageously, the more easily volatile component is used in a certain excess in this addition reaction and can, after completion of the reaction, be recovered by distillation and re-employed for a subsequent operation.

Preferably, allyl-glycidyl-hexahydrophthalic acid ester or allylglycidyl-tetrahydrophthalic acid ester is reacted with triethoxysilane or trimethoxysilane.

It has been found that these new epoxysilanes, if they are mixed into adhesives, especially those based on epoxide resin, which can be filled or unfilled, in amounts of 0.1 to 5 percent, preferably 1 percent, relative to the resin component, or are spread on the surfaces to be glued before application of the adhesive, lead to improved strength of the adhesive bonds as compared to epoxysilanes hitherto commercially available, especially after storage in water and storage in a tropical climate. This is surprising in as much as the epoxysilanes hitherto employed are free of ester groups and it was to be expected, a priori, that the ester groups in the new compounds would be split hydrolytically, at least partially, particularly after storage in water or in a tropical climate, and would therefore result in a decrease in the strength of the adhesive bonds. Possible adhesives based on epoxide resin are all compounds carrying more than one epoxide group, especially the polyglycidyl ethers of bisphenol A. Though it is known from British Patent Specification 1,092,626 that by addition of epoxysilanes when glueing glass to glass or other non-metallic substances the strength of the adhesive joints can be maintained without a great decrease after storage in water, it was not possible to deduce therefrom that the silanes of the present invention would, in the case of the glueing of metal, even further improve the strength after storage in water, since the affinity to glass which is inherent in the silanes cannot be invoked in the present case. The adhesives are used for glueing various substances, such as wood, glass and plastics, but above all for glueing metals, for example aluminium and its alloys.

EXAMPLE 1 a. Hexahydrophthalic acid allyl-glycidyl ester

A mixture of 616 g (4 mols) of hexahydrophthalic anhydride and 232 g (4 mols) of allyl alcohol is slowly heated in a suitable stirred vessel, with stirrer, thermometer and reflux condenser, in an oil bath. At 40°C all the anhydride has dissolved and at 110°–120°C the source of heat is removed because the exothermic effect of the reaction manifests itself. Within a few minutes, the temperature rises to 163°C and then drops again to 105°C over the course of 30 minutes; the batch is left to stand overnight without stirring it. After this time, an acid number of 269.6 (theoretical, 264.6) is measured. For glycidylisation, 2960 g (32 mols) of epichlorohydrin are added to the mixture and the batch is warmed to 95°C. At this temperature, a solution of 12 g of tetramethylammonium chloride in 40 g of water is added and after removing the source of heat the $p_H$ value is followed by means of a glass electrode. It rises from 5.1 to 10 over the course of 10 minutes, with a simultaneous rise in the temperature of the mixture, which is kept at 100°C by cooling. After a total of 15 minutes, the mixture is cooled to room temperature, the electrode is removed and a water separation is attached. The mixture is now heated to 50°C, 6 g of tetramethylammonium chloride are again added and 400 g of 50 percent strength sodium hydroxide solution (5 mols) are introduced dropwise from a dropping funnel over the course of 45 minutes, whilst simultaneously applying a vacuum of 115 mm and removing the water introduced and the water produced. The removal of water is thereafter continued for a further 45 minutes and a total of 282 g of water removed is obtained. 1,000 ml of water are now added to the batch in order to dissolve the NaCl formed and the organic phase is separated off. The latter is successively washed with 1,000 ml of 2.5 percent strength sodium hydroxide solution, 1,000 ml of saturated monosodium phosphate solution and 1,000 ml of water. The organic phase, 3,382.5 g, is thereafter concentrated on a water bath, up to an internal temperature of 95°C, under a pressure of 10 mm, whereby 2,242 g of epichlorohydrin are recovered and 1,065.5 g of crude ether are obtained. The latter is subsequently purified by distillation in a high vacuum, whereby 905 g of allyl-glycidylhexahydrophthalate of the formula IV, of boiling point 0.02 134.5°–138°C are obtained (=84.3 percent of theory). The product has an epoxide content of 3.71 equivalents/kg as compared to a theoretical content of 3.73.

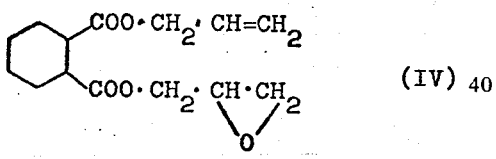

(IV)

b. Hexahydrophthalic acid glycidyl-γ-triethoxysilylpropyl ester again added and 197 g of triethoxysilane (1.2 mols) which were mixed with 0.36 ml of a 1 percent strength solution of H₂PtCl₆·6 H₂O in diethylene glycol dimethyl ether, are added dropwise over the course of 30 minutes, in a suitable stirred vessel, to 268 g of hexahydrophthalic acid allyl-glycidyl ester (1 mol) at 115°–120°C, whilst stirring. The reactioh is slightly exothermic and is maintained at approx. 120°C by occasional cooling. After a further 15 minutes, 0.18 ml of the platinum salt solution is again added and the reaction is continued for 2½ hours at 120°–125°C, after which time a further 0.18 ml of platinum salt solution is added and the mixture is stirred for a further 1½ hours at the indicated temperature. Thereafter the reaction product is cooled and freed of unreacted triethoxysilane initially on a steam both under a partial water pump vacuum and finally under a full water pump vacuum, whereby 43 g are recovered. The residue is then purified by distillation in a high vacuum, whereby 357 g of the silicon-containing ester of the formula V, or 82.7 percent of theory, pass over under 0.01 mm at 170°–171°C, as a colourless mobile liquid.

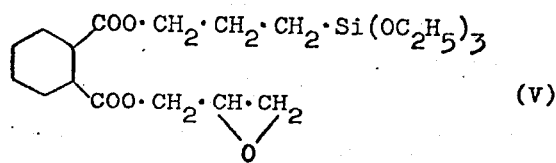

(V)

Addition of this compound, in an amount of about 1 percent to adhesives based on epoxide resin, yields products with which substantially better glueing of metals, for example as regards tensile shear strength, are achieved than without this compound.

EXAMPLE 2

In the manner described in Example 1, the tetrahydrophthalic acid allyl-glycidyl ester of the formula VI

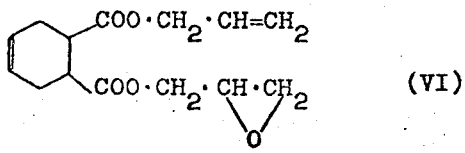

(VI)

which has a boiling point 0.01 of 123°–125°C and an epoxide content of 3.79 equivalents/kg (theoretical, 3.76) is manufactured from tetrahydrophthalic anhydride, allyl alcohol and epichlorohydrin, and is reacted analogously with triethoxysilane. The tetrahydrophthalic acid glycidyl-γ-triethoxysilylpropyl ester thus obtained, having the structure shown below, of the formula VII

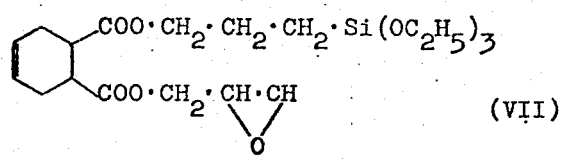

(VII)

has a boiling point of 159°–160°C under a vacuum of 0.001 mm.

COMPARISON EXPERIMENT

In order to illustrate the effectiveness of the compounds according to the invention, the following experiments were carried out, in which 2 adhesives of different formulations (A and B) based on epoxide resin, (a) without added silane, (b) with the addition of 1 percent of 1-β-trimethoxysilylethyl-3,4-epoxycyclohexane (an epoxysilane commercially available under the tradename "Silan-A186" of UCC; compare also the article "Improving Adhesives with Silane Adhesive Promoters" by M. C. Polniaszek and R. H. Schaufelberger in "Adhesives Age", July 1968, pages 25–27) and (c) with the addition of 1 percent of one of the compounds according to the invention, in each case relative to the resin component of the adhesive, were used for glueing ground sheets of "Anticorodal B", (an aluminium alloy) of size 170×25×1.5 mm, the overlap length being 10 mm. All samples were cured under contact pressure for 16 hours at 40°C.

The two tables I and II which follow show the various tensile shear strengths as measured after storage in water or under tropical conditions, the measured val-

Table I

| Storage in water at 20°C | Tensile shear strength in kp/cm² | | | | | |
|---|---|---|---|---|---|---|
| | Adhesive A | | | Adhesive B | | |
| Days | Without additive | 1% of "Silane A-186" (UCC) | 1% of product according to Example 1 | Without additive | 1% of "Silane A-186" (UCC) | 1% of product according to Example 1 |
| 0  | 130 | 140 | 170 | 180 | 200 | 200 |
| 30 | 170 | 180 | 200 | 150 | 200 | 210 |
| 60 | 170 | 190 | 210 | 130 | 200 | 210 |
| 90 | 170 | 190 | 220 | 120 | 180 | 220 |

Table II

| Storage under tropical conditions[1] | Tensile shear strength in kp/cm² | | | | | |
|---|---|---|---|---|---|---|
| | Adhesive A | | | Adhesive B | | |
| Days | Without additive | 1% of "Silane A-186" (UCC) | 1% of product according to Example 1 | Without additive | 1% of "Silane A-186" (UCC) | 1% of product according to Example 1 |
| 0  | 130 | 140 | 170 | 180 | 200 | 200 |
| 30 | 100 | 140 | 170 | 160 | 200 | 200 |
| 60 | 90  | 150 | 170 | 130 | 200 | 210 |
| 90 | 80  | 160 | 170 | 120 | 180 | 210 |

[1] Measured according to DIN 50,015 at 40°C and 92% relative atmospheric humidity.

The two adhesives had the following composition:
Adhesive A, resin
  44.5 parts of liquid epoxide resin based on bisphenol A, with an epoxide content of 5.4 equivalents/kg
  5.49 parts of polypropylene powder
  45.59 parts of baryte
  4.37 parts of "Bentone" (organic montmorillonite derivative)
Curing agent
  33.20 parts of "Versamid 140" (a polyaminoamide of Schering AG, Bergkamen, West Germany)
  4.98 parts of dimethylaminopropylamine
  3.00 parts of diethylenetriamine
  52.18 parts of baryte
  6.64 parts of "Bentone"
Adhesive B, resin
  45.55 parts of liquid epoxide resin based on bisphenol-A, with an epoxide content of 5.4 equivalents/kg
  9.82 parts of cresyl glycid
  18.22 parts of slate powder
  22.78 parts of kaolin
  1.36 parts of "Aerosil" (silica of high specific surface area)
  2.27 parts of "Bentone 34" (polar compound of montmorillonite and organic ammonium base)
Curing agent
  65.51 parts of "Versamid 125" (a polyaminoamide of Schering AG, Bergkamen, West Germany)
  6.68 parts of diethylenetriamine
  4.34 parts of bisphenol A
  24.47 parts of polyethylene powder Adhesive A was used in the ratio of 100 parts of resin to 40 parts of curing agent and adhesive B in the ratio of 100:60. The epoxysilane was in each case mixed with the resin component.

EXAMPLE 3

In the manner described in Example 2, the tetrahydrophthalic acid glycidyl-γ-diethoxy-methylsilylpropyl ester of the following structure, of the formula VIII

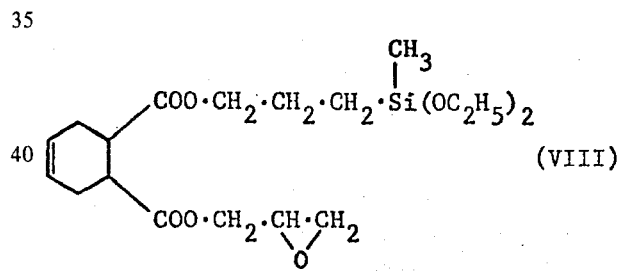

is manufactured from tetrahydrophthalic acid allylglycidyl ester of the formula VI by condensation with methyldiethoxysilane under analogous conditions. The compound has a boiling point of 150°–153°C under 0.001 mm.

The addition of 1 percent of the compound to the adhesive B (compare Table I following Example 2) gives the following values of the tensile shear strength in the water storage test at 20°C, after curing:
  0 days: 200 kg/cm² (without additive: 180 kp/cm²)
  30 days: 200 kp/cm² (without additive: 150 kg/cm²)
  60 days: 210 kg/cm² (without additive: 180 kg/cm²)
  90 days: 240 kg/cm² (without additive: 120 kg/cm²)

A similar improvement is shown in the tropical storage test (compare Table II, appended to Example 2): the addition of 1 percent of the compound VIII to the adhesive A gives the following tensile shear strengths after curing:
  0 days: 150 kp/cm² (without additive: 130 kg/cm²)
  30 days: 170 kp/cm² (without additive: 100 kp/cm²)
  60 days: 180 kp/cm² (without additive: 90 kp/cm²)
  90 days: 180 kp/cm² (without additive: 80 kp/cm²)

EXAMPLE 4

In the manner described in Examples 1 and 2, phthalic acid monoallyl ester is first manufactured from phthalic anhydride and allyl alcohol and is then converted, by means of epichlorohydrin, into the phthalic acid allyl-glycidyl ester of the following formula IX

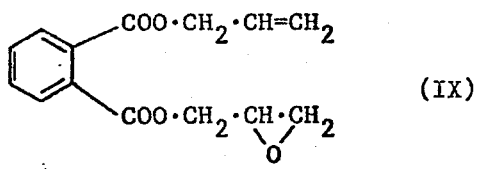

The compound has a boiling point of 127°–130°C under 0.001 mm and an epoxide content of 3.78 equivalents/kg (theory 3.82 equivalents/kg).

Condensation of this compound with methyl-dimethoxysilane as described in the preceding examples yields the phthalic acid glydicyl-γ-dimethoxymethylsilylpropyl ester of the following structure X

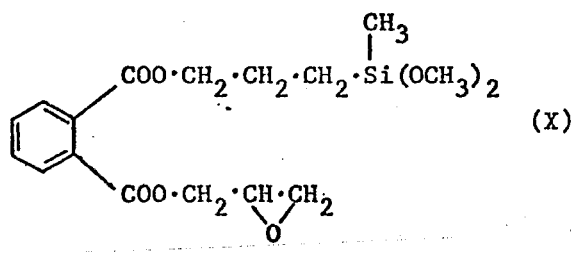

The compound has a boiling point of 162°–165°C under 0.04 mm and an epoxide content of 2.7 equivalents/kg (theory=2.63 equivalents/kg). The addition of 1 percent of the compound X to the adhesives A and B (compare Table II, appended to Example 2) gives the following values of the tensile shear strength in the tropical storage test, after curing:

Adhesive A
 0 days 140 kp/cm² (without additive: 130 kp/cm²)
 30 days 170 kp/cm² (without additive: 100 kp/cm²)
 60 days 170 kp/cm² (without additive: 90 kp/cm²)
 90 days 170 kp/cm² (without additive: 80 kp/cm²)

Adhesive B
 0 days 200 kg/cm² (without additive: 180 kp/cm²)
 30 days 200 kp/cm² (without additive: 160 kp/cm²)
 60 days 200 kp/cm² (without additive: 130 kp/cm²)
 90 days 210 kp/cm² (without additive: 120 kp/cm²)

What is claimed is:

1. A method for improving the adhesive strength and water resistance of epoxide resin adhesives which comprises incorporating in said adhesive from about 0.1 to 5 percent by weight based on the weight of adhesive, an epoxy silane of the formula:

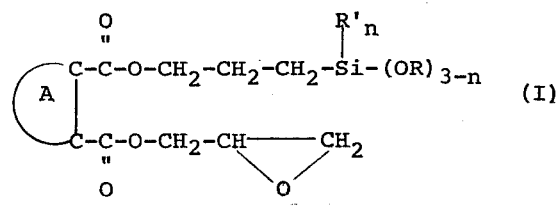

wherein A is cyclohexane, cyclohexene or benzene, R and R' is alkyl of 1 to 4 carbon atoms, and $n$ is 0, 1 or 2.

2. The method according to claim 1 wherein A is cyclohexane or cyclohexene, and $n$ is 0 or 1.

3. The method according to claim 2 wherein $n$ is 0.

4. The method according to claim 1 wherein R is ethyl or methyl.

5. The method according to claim 1 wherein said epoxy adhesive is based on bisphenol A.

* * * * *